United States Patent
Klahold et al.

(10) Patent No.: US 6,799,800 B2
(45) Date of Patent: Oct. 5, 2004

(54) LONGITUDINAL ADJUSTER FOR A VEHICLE SEAT

(75) Inventors: Wolfgang Klahold, Herne (DE); Rolf Schüler, Heiligenhaus (DE); Michael Borbe, Rheinbach (DE); Gerhard Mitulla, Bochum (DE); Falko Jähner, Solingen (DE); Jochen Scheidler, Remscheid (DE); Sascha Scheffler, Herten (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 0 days.

(21) Appl. No.: 10/792,561

(22) Filed: Mar. 3, 2004

(65) Prior Publication Data

US 2004/0164599 A1 Aug. 26, 2004

Related U.S. Application Data

(63) Continuation of application No. PCT/EP03/00536, filed on Jan. 21, 2003.

(30) Foreign Application Priority Data

Jan. 22, 2002 (DE) .......................................... 102 02 179

(51) Int. Cl.$^7$ ................................................ B60N 2/20
(52) U.S. Cl. ...................................................... 297/341
(58) Field of Search .......................... 297/341, 378.12; 248/429, 430

(56) References Cited

U.S. PATENT DOCUMENTS

| | | | |
|---|---|---|---|
| 4,547,718 A | | 10/1985 | Ratzel et al. |
| 4,844,542 A | * | 7/1989 | Humer ........................ 297/341 |
| 5,348,373 A | | 9/1994 | Stiennon |
| 5,597,206 A | * | 1/1997 | Ainsworth et al. .... 297/378.12 |
| 5,605,377 A | * | 2/1997 | Tame .......................... 297/341 |
| 5,717,300 A | | 2/1998 | Baloche et al. |
| 5,873,629 A | | 2/1999 | Schuler |
| 5,944,383 A | * | 8/1999 | Mathey et al. ............... 297/341 |
| 6,048,030 A | * | 4/2000 | Kanda et al. ................. 297/341 |
| 6,098,946 A | * | 8/2000 | Sechet et al. ................ 248/430 |
| 6,102,478 A | * | 8/2000 | Christopher ................. 297/341 |
| 6,631,952 B1 | * | 10/2003 | Liebetrau et al. ........... 297/341 |

FOREIGN PATENT DOCUMENTS

| | | |
|---|---|---|
| DE | 42 01 829 A1 | 6/1993 |
| DE | 195 09 344 A1 | 9/1996 |

* cited by examiner

Primary Examiner—Peter R. Brown
(74) Attorney, Agent, or Firm—Alston & Bird LLP (57) ABSTRACT

In a longitudinal adjuster for a vehicle seat having a freely pivotable backrest, with the longitudinal adjuster having a first seat rail, a second seat rail, in relation to which the first seat rail can be slid in the longitudinal direction, and a memory device (11) which is assigned to the first seat rail, interacts with the second seat rail and stores a longitudinal seat position which can be left by means of a longitudinal displacement of the vehicle seat when the backrest pivots freely, and resumed when the backrest pivots back, a displacement measuring device (21), which can be operatively connected to the second seat rail, and a control signal generator (53), which can move in relation to the displacement measuring device (21), are provided for playing a role in resuming the stored longitudinal seat position.

19 Claims, 4 Drawing Sheets

LONGITUDINAL ADJUSTER FOR A VEHICLE SEAT

CROSS-REFERENCE TO RELATED APPLICATION

The present application is a continuation of PCT/EP03/00536, which was filed Jan. 21, 2003, and is incorporated herein by reference in its entirety.

BACKGROUND OF THE INVENTION

The present invention relates to a longitudinal adjuster for a vehicle seat having a freely pivotable backrest, with the longitudinal adjuster having a first seat rail, a second seat rail in relation to which the first seat rail can be slid in the longitudinal direction, and a memory device which is assigned to the first seat rail, interacts with the second seat rail and stores a set longitudinal seat position which can be left by way of a longitudinal displacement of the vehicle seat when the backrest pivots freely, and resumed when the backrest pivots back.

DE 42 01 829 A1 discloses a longitudinal adjuster of the above-described type, in which a drag lever is entrained during the normal longitudinal adjustment of the vehicle seat. When the backrest pivots freely, the drag lever is lowered and engages in the fixed seat rail so that the vehicle seat can be slid forward from this stored longitudinal position. When it returns to the stored longitudinal position, the locking of the longitudinal adjuster is triggered when the drag lever is run onto, so that the vehicle seat is locked again in this longitudinal position.

BRIEF SUMMARY OF THE INVENTION

One aspect of the present invention is the provision of an improved longitudinal adjuster. In accordance with one aspect of the present invention, a longitudinal adjuster, which is for a vehicle seat having a freely pivotable backrest, includes a first seat rail, a second seat rail in relation to which the first seat rail can be slid in the longitudinal direction, and a memory device which is assigned to the first seat rail, interacts with the second seat rail and stores/remembers a longitudinal seat position which can be left by way of a longitudinal displacement of the vehicle seat when the backrest pivots freely, and resumed when the backrest pivots back, wherein a displacement measuring device, which can be operatively connected to the second seat rail, and a control signal generator, which can move in relation to the displacement measuring device, are provided. The relative movement of the control signal generator with respect to the displacement measuring device from a home position corresponds to the longitudinal displacement of the vehicle seat which has occurred. The control signal generator experiences, at the latest when the stored/remembered longitudinal seat position is reached, a control torque and then the control signal generator actuates at least one locking element which interacts with the second seat rail.

By virtue of the fact that a displacement measuring device which can be operatively connected to the second seat rail and a control signal generator which can move in relation to the displacement measuring device are provided, with the relative movement of the control signal generator with respect to the displacement measuring device from a home position representing the longitudinal displacement which has occurred, the control signal generator experiencing, at the latest when the stored/remembered longitudinal seat position is reached (i.e. when this position is reached or for example just before), a control torque and then actuating at least one locking element which interacts with the second seat rail so that the further longitudinal displacement is blocked, the sensing of the displacement and the locking effect are decoupled from one another. The forces which are necessary for the locking effect between the seat rails, i.e. the forces which are necessary for stopping the movement of the first seat rail, are, in contrast to the prior art, not taken up by the means for sensing displacement in a measuring area but rather by a separate, actuated locking element in a load area so that plastic components which can be manufactured cost-effectively can be used for the control area and measuring area, while components made of metal can be used for the load area. The control area does not need to be completely integrated into the measuring area but rather can be separated from it somewhat, which increases the versatility of the actuation possibilities.

The actual locking of the longitudinal adjuster is carried out by a separate locking device which is configured to absorb crashing forces, unlocks when the longitudinal adjuster is directly triggered and locks the longitudinal adjuster again in the newly set longitudinal seat position. This locking device is to be distinguished from the locking elements in the load area. This locking device is in principle independent of the memory device, but is generally indirectly coupled by way of the triggering of the longitudinal adjuster. For example, there may be a coupling for resetting the memory device.

A positioning lever which can, for example, be pivoted, slid or can be moved in some other way and is mounted so as to stay with the housing is preferably provided as a locking element, the positioning lever pivoting, sliding or moving out of the memory device when it is acted on by the control signal generator and interacting directly with the second seat rail, for example by way of a locking nose. A plurality of these positioning levers whose locking noses are then preferably at different distances from the preferably common pivoting axis have the advantage that the effective pitch of the second seat rail is reduced in accordance with the number of the positioning levers in the manner of the vernier principle so that one of the positioning levers is sure to be effective, i.e. stops the movement of the vehicle seat.

When a smaller number of positioning levers are to be provided, a positioning lever can be replaced with a non-movable place holder made of plastic and shaped like the positioning lever being replaced. The positioning levers are preferably capable of being actuated individually and can be lifted out together, for example by virtue of the fact that the control signal generator acts on them in the one pivoting direction by way of individual tongues and in the other pivoting direction by way of a common bracket.

In one preferred embodiment, the control signal generator which is embodied as a spindle nut runs on a spindle of the displacement measuring device, which permits the distance which is covered from the stored/remembered longitudinal seat position to be stored precisely. In order to define the home position of the control signal generator and to transmit the control torque, the control signal generator on the one hand, and a block of the displacement measuring device on the other hand, each preferably have a stop face. The stop faces move into a position in which they bear against one another when the stored/remembered longitudinal seat position is reached, and in doing so transmit the control torque. The distance traveled is preferably sensed by way of a rotatably mounted running wheel which interacts with the second seat rail in a switchable/disassociatable fashion and is operatively connected to the displacement measuring device. As the running wheel does not have to apply any locking forces, it can interact with the second seat rail in a frictionally locking fashion or with fine toothing.

The running wheel is preferably mounted on a pivotable switching lever or a multi-element lever arrangement which disconnects the running wheel from the second seat rail in order to store a newly set/new remembered longitudinal seat position, that is to say in order to reset the memory device. A reset spring of the displacement measuring device which is preferably provided then moves the control signal generator into its home position. So that there is as far as possible no play, and therefore no slip, in that state in which the running wheel is seated on the second seat rail, a contact pressure spring is preferably provided. The contact pressure spring presses the running wheel against the second seat rail, for example by acting on the switching lever.

The entire memory device, with the exception of projecting locking elements and possible control elements for resetting the memory device, is preferably arranged within an installation space which is defined by the first seat rail, that is to say embodied as a type of module. In comparison with the prior art, this provides a large saving in terms of installation space with a memory device which is arranged outside the seat rails.

An actuation device which, when the longitudinal adjuster is directly triggered, resets the memory device in order to permit a new longitudinal seat position (e.g., a new remembered longitudinal position) to be stored is preferably provided, in which case, when the backrest pivots freely, the memory device is decoupled without resetting so that the remembered longitudinal seat position which is set remains stored and can be found again. The actuation device can be mounted on the first seat rail above the memory device, that is to say in the direct vicinity of the memory device, which simplifies the resetting of the memory device. In the process, the actuation device can at the same time form a component of the unlocking system of the longitudinal adjuster by virtue of the fact that it supports, for example, components which are necessary for it. During the free pivoting, the actuation device can then preferably unlock the locking device.

The invention is preferably used for vehicle seats of two-door motor vehicles, but can also be used with other vehicle seats.

BRIEF DESCRIPTION OF THE DRAWINGS

The invention is explained in more detail below with reference to an exemplary embodiment which is illustrated in the drawings, in which.

DETAILED DESCRIPTION OF THE INVENTION

A vehicle seat 1 (FIG. 3) for a two-door motor vehicle is longitudinally displaceable in its entirety by way of a longitudinal adjuster 3, and can therefore assume various longitudinal seat positions. The backrest 5 of the vehicle seat 1 is mounted on the seat part 4 so as to have an adjustable angle of inclination. The backrest 5 is freely pivotable, i.e. can be folded forward in order to permit access to the rear seats (e.g., the backrest 5 can be pivoted out of and back to a predetermined orientation). In order to obtain the widest possible access, when the backrest 5 pivots freely the longitudinal adjuster 3 is unlocked at the same time so that the vehicle seat 1 can be slid forward. When the backrest 5 pivots back, the vehicle seat 1 is slid back to the previously assumed/remembered longitudinal seat position where it is locked. In order to store this previously assumed/remembered longitudinal seat position, a memory device 11 (FIGS. 1 and 2) is provided.

Figure 2:
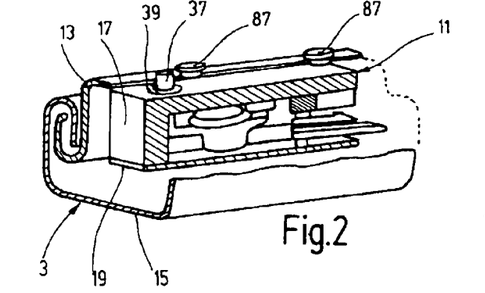
FIG. 2 shows a perspective partial view of the exemplary embodiment illustrated in section, the direction of travel pointing to the left.
Figure 3:
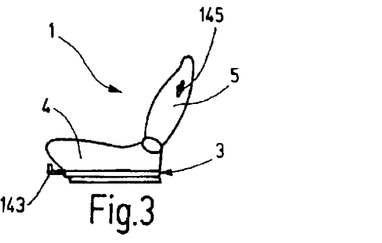
FIG. 3 shows a schematic illustration of a vehicle seat.
Figure 4:
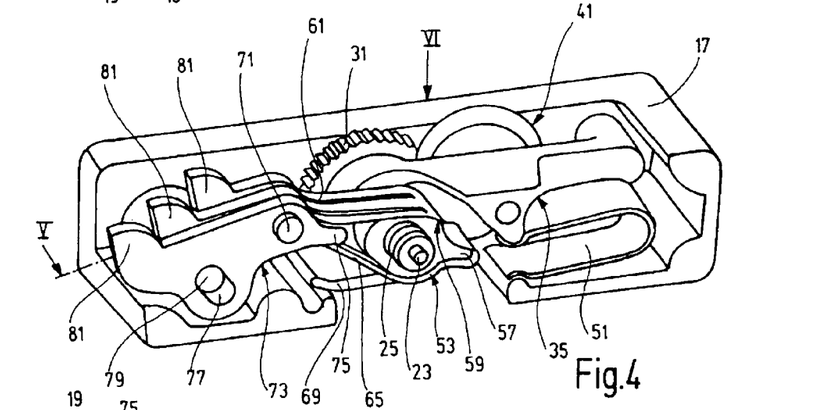
FIG. 4 shows a perspective view of the memory device from below, without a cover, the direction of travel pointing to the right.
Figure 10:
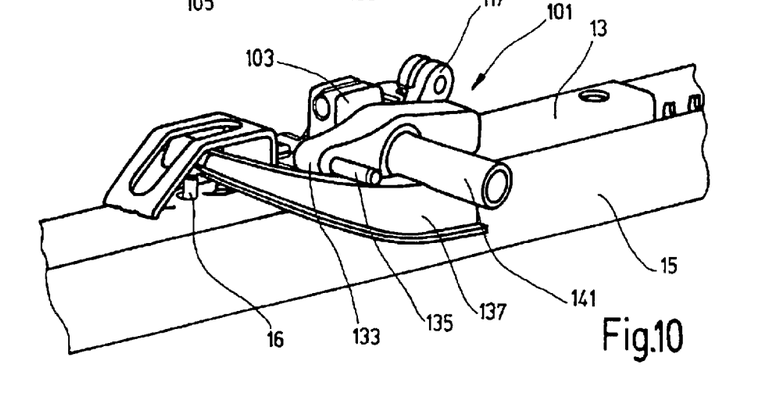
FIG. 10 shows a perspective view of the exemplary embodiment in the region of the locking, memory and actuation device.

As best understood with reference to FIG. 2, the memory device 11 is arranged within an inner installation space of an upper rail 13 which is one of two first seat rails of the longitudinal adjuster 3. The upper rail 13 is fixed to the seat structure and is capable of being slid in the longitudinal direction of the vehicle seat 1 in relation to the lower rail 15. The lower rail 15 is fixed to the structure of the vehicle, is one of two second seat rails of the longitudinal adjuster 3, and is capable of being locked by way of a locking device 16 (FIG. 10). The memory device 11 has a housing 17 which has walls which are largely closed at least in the upward and forward directions, and is closed on the underside by a screwed-on cover 19. The longitudinal side, of two longitudinal sides, which is completely opened is referred to below as the outward pointing side, while the opposite, only partially opened longitudinal side is referred to as the inward pointing side.

Figure 1:
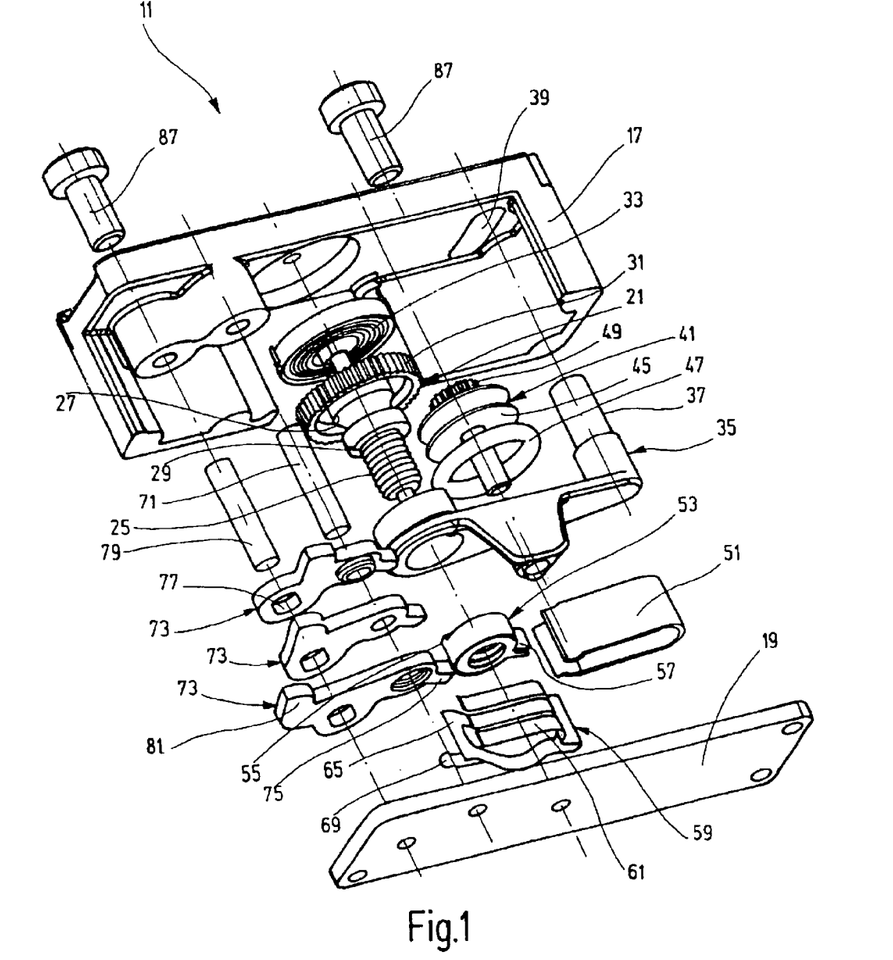
FIG. 1 shows an exploded illustration of a memory device of the exemplary embodiment.

A displacement measuring device 21, which has a central axis, is rotatably mounted in the upper wall of the housing 17 or in the cover 19 by way of bearing pins 23. The bearing pins 23 are provided on the upper and lower ends of the central axis of the displacement measuring device 21. The displacement measuring device 21, which is constructed in one piece, has a spindle 25 along its central axis, with the spindle respectively extending from below and above the bearing pins 23. The spindle 25 is adjoined by a bearing block 27 which is provided with an annular cut-out. The bearing block 27 has a first stop face 29 in the region of the end side facing downwards to the spindle 25. The stop face 29 is arranged so that it runs radially outwards and perpendicular to this end side, i.e. in the longitudinal direction of the central axis, and is formed as a shoulder in the circumferential direction. On the upwardly pointing end side of the bearing block 27 there is an adjoining large gearwheel 31 which partially engages over the bearing block 27 in the radial direction. In the upward direction the large gearwheel 31 is adjoined by the other bearing pin 23 of the displacement measuring device 21. In addition, a reset spring 33, which is of spiral design, is mounted on this bearing pin 23 and its inner end is permanently supported on the bearing pin 23 and its external end on the housing 17. A switching lever 35 bears, at its free end, a control bolt 37 which is arranged in parallel with the central axis of the displacement measuring device 21. The switching lever 35 is pivotably mounted on the bearing block 27. The upwardly protruding control bolt 37 projects through a control gate 39 of the housing 17 and over the upper side of the housing 17.

A running wheel 41, whose axis is arranged in parallel with the central axis of the displacement measuring device 21 and with the control bolt 37, is rotatably mounted in the switching lever 35 by way of a second bearing pin 43. The running wheel 41 has a rim 45 which is permanently connected to the second bearing pin 43 and which holds an annular tire 47 made of rubber or plastic. A small gearwheel 49 is mounted or integrally formed on the upper end side of the rim 45 and intermeshes with the large gearwheel 31. A contact pressure spring 51 which is supported on the housing 17 prestresses the switching lever 35 to the outward pointing side of the housing 17, i.e. in the clockwise direction viewed from above.

A control signal generator 53 which is embodied as a spindle nut is screwed onto the spindle 25. Depending on the desired orientation of the memory device 11 with respect to the longitudinal direction of the rails, the threads of the spindle 25 and the control signal generator 53 are right-handed or left-handed threads. The control signal generator 53 has a second stop face 55 on its end side which points upwards to the bearing block 27. The stop face 55 is designed, in terms of its orientation, i.e. in the present case running in the longitudinal direction of the central axis, and in terms of its dimensions, to interact with the first stop face 29. The control signal generator 53 has a radially protruding control nose 57 which is designed to entrain a control spring 59 in a manner which is fixed in terms of rotation. The control spring 59 which is punched out of spring sheet metal virtually completely surrounds the control signal generator 53 together with the control nose 57 in the circumferential direction. On the outward pointing side of the housing 17, the end of the control spring 59 is divided into three control tongues 61, while the end which faces the inward pointing side has a section which is closed in the form of a bracket, referred to below as control bracket 65, and a single supporting tongue 69 for providing support on the housing 17.

Three positioning levers 73 are pivotably mounted one on top of the other on a bearing bolt 71 which is parallel to the central axis of the displacement measuring device 21 and mounted in the housing 17 and cover 19. The three positioning levers 73 each have a control finger 75 on their forward pointing end. Each control finger 75 bears against a control tongue 61 on the one side and against the control bracket 65 on the other side. On the opposite downwardly pointing end, the positioning levers 73 each have a guide gate 77 which is curved around the bearing bolt 71 at the opposite end pointing towards the rear. The guide gates 77 accommodate a common guide bolt 79 which is arranged parallel to the bearing bolt 71 and is attached to the housing 17. Each positioning lever 73 has a locking nose 81 which points outward to the opened side wall of the memory device 11. Here, the locking noses 81 of the individual positioning levers are arranged at different radial distances from the bearing bolt 71. The locking nose 81 of the top positioning lever 73 is at the smallest radial distance, and the locking nose 81 of the lowest positioning lever 73 is at the largest radial distance. The control spring 59, which is supported by the supporting tongue 69, prestresses the positioning levers 73 in the inward direction so that the locking noses 81 are normally arranged in the interior of the housing 17.

The displacement measuring device 21, the switching lever 35 and the respectively assigned components form a control and measuring area of the memory device 11, while the positioning levers 73 form a load area with their bearings. The entire memory device 11 is screwed to the wall of the upper rail 13, which bounds the internal installation space in the upward direction, by way of attachment screws 87 on said upper rail 13.

In the position of use of the vehicle seat 1, the longitudinal adjuster 3 is locked. Within the memory device 11, the control signal generator 53 is located at the upper end of the spindle 25 and bears with the second stop face 55 against the first stop face 29 of the bearing block 27 of the displacement measuring device 21 without, however, the end sides of the control signal generator 53 and of the bearing block 27 touching one another. The contact pressure spring 51 presses, by way of the switching lever 35, the running wheel 41 through an opening in the upper rail 13 into a position in which it bears against the lower rail 15. This longitudinal seat position which is set is referred to below as the remembered position.

When the backrest 5 pivots freely, inter alia the longitudinal adjuster 3 is also unlocked. The upper rail 13 can then be slid forward in the longitudinal direction of the seat in relation to the lower rail 15 on both sides of the vehicle seat 1. Owing to the relative displacement between the upper rail 13 and lower rail 15, the running wheel 41 runs along the lower rail 15 due to friction. As a result of the small gearwheel 49, the large gearwheel 31 is turned so that the displacement measuring device 21 is driven. The control signal generator 53 moves along the spindle 25 in the downward direction in the process. The distance traveled by the vehicle seat 1 is in direct relation to the displacement of the control signal generator 53 along the displacement measuring device 21 by virtue of the transmission ratio between the two gearwheels 49 and 31 and the geometric dimensioning of the spindle 25. Correspondingly, the length of the spindle 25 is matched to the maximum displacement travel.

Figure 5:
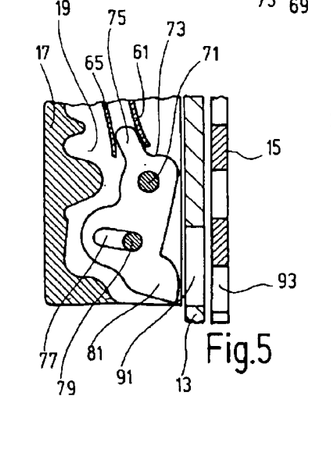
FIG. 5 shows a section through the memory device in the region of the positioning levers along the line V in FIG. 4.
Figure 6:
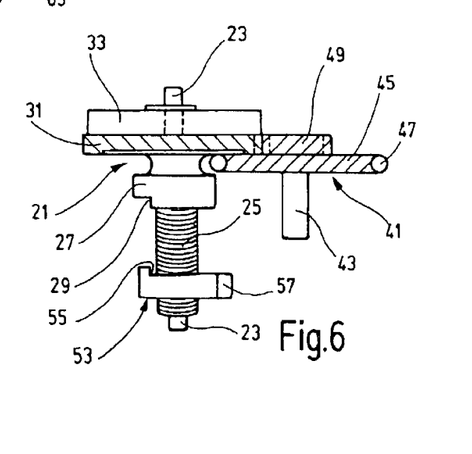
FIG. 6 shows a partial view, represented in a partially sectional form, of the memory device in the region of the displacement measuring device, viewed in the direction of the arrow VI in FIG. 4.

When the vehicle seat 1 is slid back, the control signal generator 53 moves back towards the bearing block 27. As soon as the second stop face 55 moves into a position in which it bears against the first stop face 29, a control torque is produced which causes the control signal generator 53 to turn further, i.e. in the clockwise direction viewed from above in the drawing. The control spring 59, which presses with its control tongues 61 on the control fingers 75 of the positioning levers 73, is acted on via the control nose 57 of the control signal generator 53. The positioning levers 73 thus pivot outwards, the pivoting movement of the positioning levers 73 being limited by the relative movement of the guide gate 77 and of the guide bolt 79. The locking noses 81 pass through windows 91 (FIG. 5) in the upper rail 13. The locking nose 81 of at least one positioning lever 73 moves into a gap 93 between teeth on the lower rail 15 so that this locking mechanism stops the relative movement of the upper rail 13 with respect to the lower rail 15. The vehicle seat 1 has thus reached its remembered position again. The locking device 16 (FIG. 10) then locks the longitudinal adjuster 3 again, with the result that the vehicle seat 1 is again available for use as a seat. By way of the control bracket 65, the control spring 59 pivots the positioning levers 73 back into the interior of the housing 17.

The remembered position can be reset under circumstances described below, for example during the normal longitudinal setting of the vehicle seat 1 or independently thereof, i.e. the memory device 11 can be reset. For this purpose, the control bolt 37 is moved along the control gate 39 so that the control bolt 37 pivots the switching lever 35 into the interior of the housing 17, out of the position which is provided closer to the outward pointing side of the memory device 11. The running wheel 41 is thus lifted off from the lower rail 15, the small gearwheel 49 remaining in engagement with the large gearwheel 31. The reset spring 33 drives the displacement measuring device 21 so that, if the control signal generator 53 is not yet at the upper end of the spindle 25, it is turned upward until the stop faces 29 and 55 bear against one another, but the end sides of the control signal generator 53 and of the bearing block 27 do not. After the control bolt 37 has been released, the contact pressure spring 51 places the running wheel 41 back onto the lower rail 15 and holds it without play. The new remembered position is thus stored.

Figure 7:
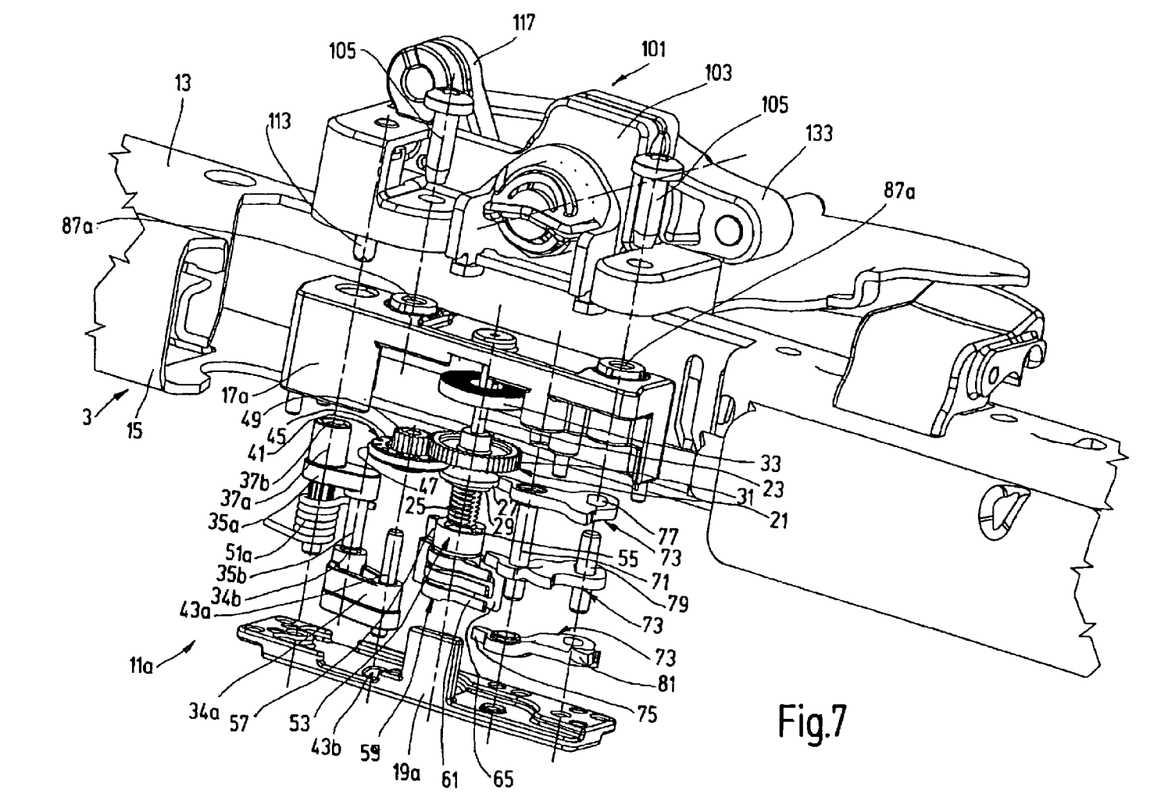
FIG. 7 shows an exploded illustration with a modified memory device.

FIG. 7 shows a modification of the memory device 11 in which identical components are provided with identical reference symbols and identically acting components are provided with reference symbols which are supplemented by small letters. The modified memory device 11a corresponds essentially to that exemplary embodiment unless described differently below. It is distinguished by virtue of the fact that the control area is separated more distinctly from the measuring area which is formed by the displacement measuring device 21 and its assigned components. For this purpose, the running wheel 41 is mounted in a rotatable fashion with its rim 45 on a bearing axis 43a which is parallel to the spindle 25 and which is guided at one end in the cover 19a in a bearing gate 43b, and at the other end in the housing 17a in an identically curved groove. A running wheel lever 34a is seated fixed in terms of rotation on the bearing axis 43a, between the running wheel 41 and the bearing gate 43b.

A control bolt 37a which is in parallel with the bearing axis 43a is rotatably mounted in the control area in the housing 17a and in the cover 19a. A switching lever 35a which protrudes radially is integrally formed on the control bolt 37a and bears, in parallel with the control bolt 37a, a switching pin 35b which is in turn rotatably mounted in a switching pin receptacle 34b of the running wheel lever 34a. A contact pressure spring 51a, which is wound round the control bolt 37a, acts on the switching lever 35a in such a way that the running wheel 41 is pressed against the lower rail 15 by way of the running wheel lever 34a. The control bolt 37a has, at the end mounted in the housing 17a, a profiled control receptacle 37b which is accessible from the upper side of the memory device 11a. Furthermore, two centering domes 87a with blind holes are provided on the upper side of the memory device 11a. In the load area, only the sequence of the distances between the locking noses 81 differs from that of the memory device 11 on the positioning levers 73 so that the central positioning lever 73 bears the locking nose 81 with the smallest radial distance from the bearing bolt 71.

In order to reset the memory device 11 or 11a given the normal longitudinal setting of the vehicle seat 1, an actuation device 101 (FIGS. 7–10) is arranged above the memory device 11 or 11a on the upper rail 13. In what follows, its method of operation is explained with reference to the memory device 11a. In order to support a plurality of movable components, the actuation device 101 has an adapter 103 whose mounting screws 105 on the centering domes 87a are screwed into the memory device 11a, as a result of which the actuation device 101 and the memory device 11a are fastened. A vertically arranged control shaft 111 is introduced from below into the adapter 103 and rotatably mounted by its upper end in the adapter 103. The control shaft 111 supports, with its axis of rotation, a formed-on, profiled control pin 113 in an aligned arrangement. The control pin 113 is plugged fixed in terms of rotation into the control receptacle 37b of the memory device 11a. In addition, a radially protruding involute tooth 115 is formed onto the control shaft 111. In the case of the memory device 11, the control pin 113 would be arranged offset with respect to the axis of rotation of the control shaft 111.

Figure 8:
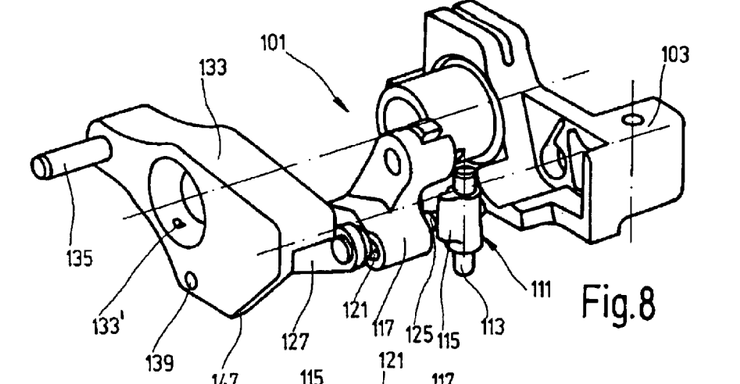
FIG. 8 shows an exploded illustration of an actuation device of the exemplary embodiment.
Figure 9:
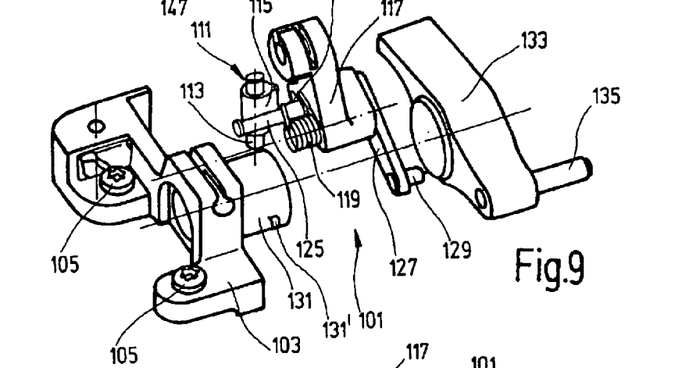
FIG. 9 shows a further exploded illustration of the actuation device from the opposite direction.

In addition, a rocker 117 with a horizontal axis of rotation is mounted on the adapter 103, in an integrally formed-on bearing shell. The rocker 117 is prestressed by way of a rotary spring 119 and bears against a projection of the adapter 103 which serves as a stop. The rocker 117 has a gate 121 for a horizontally arranged bolt 125 which can move within the gate 121 and, in the home position, is arranged at a small distance from the involute tooth 115 of the control shaft 111, the selected distance being adapted in order to compensate for tolerances. The bolt 125 is attached to a pusher rod 127, from one end of which it protrudes perpendicularly. From the other end of the pusher rod 127, a pusher-rod bearing pin 129, which is permanently connected to the pusher rod 127, protrudes in the opposite direction from the bolt 125.

The laterally protruding bearing sleeve 131 is integrally formed onto the adapter 103 and has a double-armed pressing element 133 pivotably mounted on it. Here, a securing nose 133', which interacts with a securing groove 131' on the outside of the bearing sleeve 131 in order to axially secure the pressing element 133, is integrally formed on the bearing face of the pressing element 133. One arm of the pressing element 133 rests on the rocker 117. The other arm bears, on the side facing away from the adapter 103, a horizontally protruding cylinder pin 135 which rests on a downwardly pointing unlocking lever 137. A bearing eyelet 139, into which the pusher-rod bearing pin 129 engages, is provided in the pressing element 133, in the region underneath the bearing sleeve 131.

The unlocking lever 137 is attached at one end in a manner which is fixed in terms of rotation to a transverse tube 141 which is rotatably mounted within the bearing sleeve 131. By the other end, the unlocking lever 137 can unlock the locking device 16 which is arranged within the upper rail 13, and only one bolt of which, which projects upwards from the upper rail 13, is illustrated in the drawing. A longitudinal-adjuster triggering bracket 143 (FIG. 3) is mounted fixed in terms of rotation on the transverse tube 141 in the direction facing away from the unlocking lever 137 and is accessible to a vehicle occupant underneath the front end of the seat part 4. A backrest unlocking lever 145 which is mounted on the side of the backrest 5 is operatively connected to the free end of the rocker 117 via a Bowden cable (not illustrated).

If the longitudinal adjuster 3 is then triggered (direct triggering) by actuating the longitudinal-adjuster triggering bracket 143, the transverse tube 141 turns about its longitudinal axis and in doing so pivots downwards the unlocking lever 137 which unlocks the locking device 16 counter to a spring force. At the same time, the unlocking lever 137 entrains the pressing element 133 by bearing against a control bump 147 (FIG. 8) on the pressing element 133. The pressing element 133 slides the pusher rod 127 in its longitudinal direction by way of the pusher-rod bearing pin 129, and the pusher rod 127 in turn slides the bolt 125 within the gate 121. The bolt 125 exerts a torque on the involute tooth 115 of the control shaft 111 so that the control shaft 111, and thus the control pin 113, turn. As a result, a reset of the memory device 11a is initiated.

The control pin 113 turns the control bolt 37a, which pivots the switching lever 35a which in turn pivots, by way of the running wheel lever 34a, the running wheel 41 into the interior of the housing 17a and as a result lifts it off from the lower rail 15. The reset spring 33 drives the displacement measuring device 21 so that the control signal generator 53 is turned upward, if it is not yet at the upper end of the spindle 25, until the stop faces 29 and 55 move into a position in which they bear against one another, but the end sides of the control signal generator 53 and of the bearing block 27 do not bear against one another. If the new longitudinal seat position has been reached and the longitudinal adjuster 3 is locked again by way of the locking device 16, the actuation device 101 releases the control bolt 37a so that the contact pressure spring 51a places the running wheel 41 back onto the lower rail 15, and keeps it free of play, by way of the lever arrangement which is present there. The new remembered position is thus stored.

If the longitudinal adjuster 3 is triggered during the free pivoting by tension on the backrest unlocking lever 145 (indirect triggering), the rocker 117 is pivoted upward (and rearward) counter to the force of the rotary spring 119. The bolt 125 is removed from the control shaft 111. Because of the change in direction of the guide 121, it is also impossible for any further movement onto the control shaft 111 to take place. The memory device 11a is thus decoupled so that no reset takes place. The pivoting rocker 117 presses from below onto the pressing element 133 at the end of the pressing element 133 which faces away from the cylinder pin 135, the pressing element 133 pivoting about the bearing sleeve 131 and pressing with the cylinder pin 135 onto the unlocking lever 137. The unlocking lever 137 pivots downward and as a result unlocks the locking device 16. The vehicle seat 1 can then be slid forward, the memory device 11a finding the remembered position, as described above, when the seat returns.

That which is claimed:

1. A longitudinal adjuster for a vehicle seat having a backrest that can be pivoted out of and back to a predetermined orientation, the longitudinal adjuster comprising:

first and second seat rails that each extend in a longitudinal direction, with the first and second seat rails being mounted for there being relative longitudinal displacement therebetween; and a memory device which remembers a longitudinal position of the first and second seat rails with respect to one another, wherein:

the memory device is operative so that:

the first and second seat rails are capable of being moved out of the remembered longitudinal position, via relative longitudinal displacement between the first and second seat rails, in response to the backrest being pivoted out of the predetermined orientation, and the first and second seat rails are capable of being returned to the remembered longitudinal position, via relative longitudinal displacement between the first and second seat rails, while the backrest is being pivoted back to the predetermined orientation, the memory device includes a control signal generator mounted for moving relative to a displacement measuring device in response to the relative longitudinal displacements between the first and second seat rails, with the moving of the control signal generator being relative to a home position of the control signal generator, and the moving of the control signal generator with respect to the home position correlating to magnitudes of the relative longitudinal displacements between the first and second seat rails, and the control signal generator experiences, at the latest when the remembered longitudinal position is reached via the relative longitudinal displacement between the first and second seat rails while the backrest is being pivoted back to the predetermined orientation, a control torque and then the control signal generator actuates at least one locking element so that the locking element interacts with the second seat rail to restrict relative longitudinal displacement between the first and second seat rails.

2. A longitudinal adjuster according to claim 1, wherein:

the locking element is a positioning lever, whereby the control signal generator actuates the positioning lever so that the positioning lever interacts with the second seat rail to restrict relative longitudinal displacement between the first and second seat rails, the positioning lever is mounted on a pivot axis, the pivot axis is fixed to a housing of the memory device, the positioning lever includes a locking nose, and when the control signal generator actuates the positioning lever, the positioning lever pivots out of the memory device and the locking nose interacts with the second seat rail to restrict relative longitudinal displacement between the first and second seat rails.

3. A longitudinal adjuster according to claim 2, wherein:

the positioning lever is a first positioning lever, the memory device further includes a second positioning lever that includes a locking nose for selectively interacting with the second seat rail to restrict relative longitudinal displacement between the first and second seat rails, and the locking nose of the first positioning lever and the locking nose of the second positioning lever are at different distances from the pivot axis.

4. A longitudinal adjuster according to claim 3, wherein the control signal generator includes:

a first individual tongue which acts on the first positioning lever in a first pivoting direction, a second individual tongue which acts on the second positioning lever in the first pivoting direction, and a common bracket which acts on both the first and second positioning levers in a second pivoting direction, wherein the second pivoting direction is opposite from the first pivoting direction.

5. A longitudinal adjuster according to claim 3, wherein the second positioning lever is mounted on the pivot axis and the control signal generator actuates the second positioning lever so that the second positioning lever pivots out of the memory device and the locking nose of the second positioning lever interacts with the second seat rail to restrict relative longitudinal displacement between the first and second seat rails.

6. A longitudinal adjuster according to claim 1, wherein the displacement measuring device includes a spindle, the control signal generator is movably mounted on the spindle, and the moving of the control signal generator includes the control signal generator traveling along the spindle.

7. A longitudinal adjuster according to claim 1, wherein:

the control signal generator includes a stop face, the displacement measuring device includes a block having a stop face, and the stop faces bear against one another when the remembered longitudinal position is reached, and the stop faces transmit the control torque while the stop faces bear against one another.

8. A longitudinal adjuster according to claim 1, wherein the memory device includes a running wheel that is mounted for both rolling along the second seat rail and for being disassociated from the second seat rail, and the running wheel is operatively connected to the displacement measuring device so that the signal generator moves relative to the displacement measuring device in response to the running wheel rolling along the second seat rail.

9. A longitudinal adjuster according to claim 8, wherein the running wheel is mounted on a lever or a lever arrangement which disassociates the running wheel from the second seat rail in order to reset the memory device by establishing a new remembered longitudinal position.

10. A longitudinal adjuster according to claim 8, wherein force of a pressure spring presses the running wheel against the second seat rail, and the force can be overcome so as to disassociate the running wheel from the second seat rail.

11. A longitudinal adjuster according to claim 1, wherein the displacement measuring device has a reset spring which moves the control signal generator into the home position in order to reset the memory device.

12. A longitudinal adjuster according to claim 1, wherein the memory device is arranged within an installation space which is defined by the first seat rail.

13. A longitudinal adjuster according to claim 1, further comprising:
  an actuation device for resetting the memory device so that the memory device can remember a different longitudinal position of the first and second seat rails with respect to one another, wherein the memory device is operative so that the memory device is not reset for remembering a different longitudinal position in response to the backrest being pivoted relative to the predetermined orientation; and
  a triggering mechanism for at least both:
    actuating the actuation device so that the memory device can remember a different longitudinal position of the first and second seat rails with respect to one another, and
    enabling relative longitudinal displacement between the first and second seat rails.

14. A longitudinal adjuster according to claim 13, wherein:
  the memory device is arranged within an installation space which is defined by the first seat rail, and
  the actuation device is mounted on the first seat rail above the memory device.

15. A longitudinal adjuster according to claim 13, further comprising a locking device for locking the longitudinal adjuster in the remembered longitudinal position to restrict relative longitudinal displacement between the first and second seat rails, wherein the triggering mechanism enables relative longitudinal displacement between the first and second seat rails by unlocking the locking device and the actuation device supports components for unlocking the locking device.

16. A longitudinal adjuster according to claim 15, wherein the actuation device unlocks the locking device in response to the backrest being pivoted out of the predetermined orientation.

17. A longitudinal adjuster according to one of claim 13, further comprising a locking device that:
  locks the longitudinal adjuster in the remembered longitudinal position to restrict relative longitudinal displacement between the first and second seat rails,
  is unlocked by the triggering mechanism to enable relative longitudinal displacement between the first and second seat rails, whereby the triggering mechanism is for enabling relative longitudinal displacement between the first and second seat rails; and
  locks the longitudinal adjuster in the different longitudinal position to restrict relative longitudinal displacement between the first and second seat rails.

18. A longitudinal adjuster according to claim 1, further comprising:
  a locking device for locking the longitudinal adjuster in the remembered longitudinal position to restrict relative longitudinal displacement between the first and second seat rails; and
  a triggering mechanism for at least unlocking the locking device to enable relative longitudinal displacement between the first and second seat rails.

19. A longitudinal adjuster according to claim 1, wherein the longitudinal adjuster is in combination with the vehicle seat.

* * * * *